(12) United States Patent
Kareenahalli et al.

(10) Patent No.: US 6,910,114 B2
(45) Date of Patent: Jun. 21, 2005

(54) ADAPTIVE IDLE TIMER FOR A MEMORY DEVICE

(75) Inventors: Suryaprasad Kareenahalli, Folsom, CA (US); Zohar B. Bogin, Folsom, CA (US); Mihir D. Shah, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 297 days.

(21) Appl. No.: 10/298,201

(22) Filed: Nov. 15, 2002

(65) Prior Publication Data

US 2004/0098550 A1 May 20, 2004

(51) Int. Cl.[7] ............................................. G06F 12/00
(52) U.S. Cl. ..................................................... 711/167
(58) Field of Search .................................. 711/100, 105, 711/154, 167, 206–209

(56) References Cited

U.S. PATENT DOCUMENTS

| | | | | |
|---|---|---|---|---|
| 5,809,563 A | * | 9/1998 | Yamada et al. | 711/207 |
| 6,052,134 A | * | 4/2000 | Foster | 345/533 |
| 6,199,145 B1 | * | 3/2001 | Ajanovic et al. | 711/149 |
| 6,269,433 B1 | * | 7/2001 | Jones et al. | 711/168 |
| 6,389,514 B1 | * | 5/2002 | Rokicki | 711/136 |
| 6,604,186 B1 | * | 8/2003 | Fanning | 711/209 |
| 6,785,793 B2 | * | 8/2004 | Aboulenein et al. | 711/167 |
| 6,799,241 B2 | * | 9/2004 | Kahn et al. | 711/105 |

* cited by examiner

*Primary Examiner*—Nasser Moazzami
(74) *Attorney, Agent, or Firm*—Sharon Wong (57) ABSTRACT

Embodiments of the present invention provide for adaptively tuning the memory idle timer value in real time. Selected memory idle clock cycles are sampled to dynamically determine an optimized memory idle timer value. To optimize latency during sampling, the number of page hits ($N_{PH}$) and number of page misses ($N_{PM}$) are multiplied by weighted values $W_{PH}$ and $W_{PM}$, respectively, such that the weighted function ($W_{PH}*N_{PH}$)−($W_{PM}*N_{PM}$) is maximized. The weight associated with a page miss ($W_{PM}$) is greater than the weight associated with a page hit ($W_{PH}$), resulting in a bigger penalty for a page miss than a page hit. The selected setting is continuously optimized.

18 Claims, 6 Drawing Sheets

ADAPTIVE IDLE TIMER FOR A MEMORY DEVICE

BACKGROUND

Computer systems that employ a processor, such as a CPU, often utilize a memory controller. The memory controller controls access by the processor and other agents to a memory, such as main memory. The main memory is typically implemented using arrays of Dynamic Random Access Memory (DRAM). When the memory remains inactive for a given period of time, it is advantageous to close its pages so that future requests to the memory will be performed with "page empty" timing. Performance gain is typically realized when future requests result-in more "page misses" than "page hits." Conversion to page empties thus increases memory efficiency and reduces latency. Additionally, when page closing is aggressive, subsequent page hits will be converted to page empty accesses, thus increasing latency.

A memory idle timer value determines the number of host bus clock cycles that the memory controller will remain in the idle state before open pages are closed. Typically, different benchmarks perform better with different memory idle timer settings. In particular, some benchmarks perform best when an aggressive memory idle timer setting of zero (0) clock cycle is used, while others perform best with memory idle timer settings of eight (8), sixteen (16) or infinite clock cycles. In some cases, the performance swing between the best and worst selection of memory idler timer values is significant.

After each memory access, the number of idle memory clocks is counted and if there are no same page requests, the page is closed. For example, after a memory read or write request, the system waits for a fixed amount of memory clocks and determines whether there is a request from that page. If there is none, the page is closed.

Conventionally, the memory idle timer timeout value is set by BIOS at boot and never changed. This static memory idle timer value will be a compromise of results for various benchmarks. Finding out the compromise value for the memory idle timer is typically a time consuming and inefficient process.

DETAILED DESCRIPTION

In the following description, numerous specific details are provided, such as the description of various computer system components in FIG. 1, to provide a thorough understanding of embodiments of the invention. One skilled in the relevant art will recognize, however, that the invention can be practiced without one or more of the specific details, or with other methods, components, etc. In other instances, well-known structures or requests are not shown or described in detail to avoid obscuring aspects of various embodiments of the invention.

Embodiments of the present invention provide for adaptively tuning the DRAM idle timer value in real time. Selected DRAM idle clock cycles are sampled to dynamically determine an optimized DRAM idle timer value. To optimize latency during sampling, the number of page hits (NPH) and number of page misses (NPM) are multiplied by weighted values WHP and WPM, respectively, such that the weighted function (WPH*NPH)−(WPM*NPM) is maximized. The weight associated with a page miss (WPM) is greater than the weight associated with a page hit (WPH), resulting in a bigger penalty for a page miss than a page hit. The weight values are programmable through configuration registers by the BIOS.

The optimized idle clock setting is used for normal operation. This setting is continuously optimized. In particular, the current weighted function is compared with the optimized weighted function and if the difference is greater than a predefined threshold range, another optimized idle clock setting is determined using the sample settings again.

Figure 1:
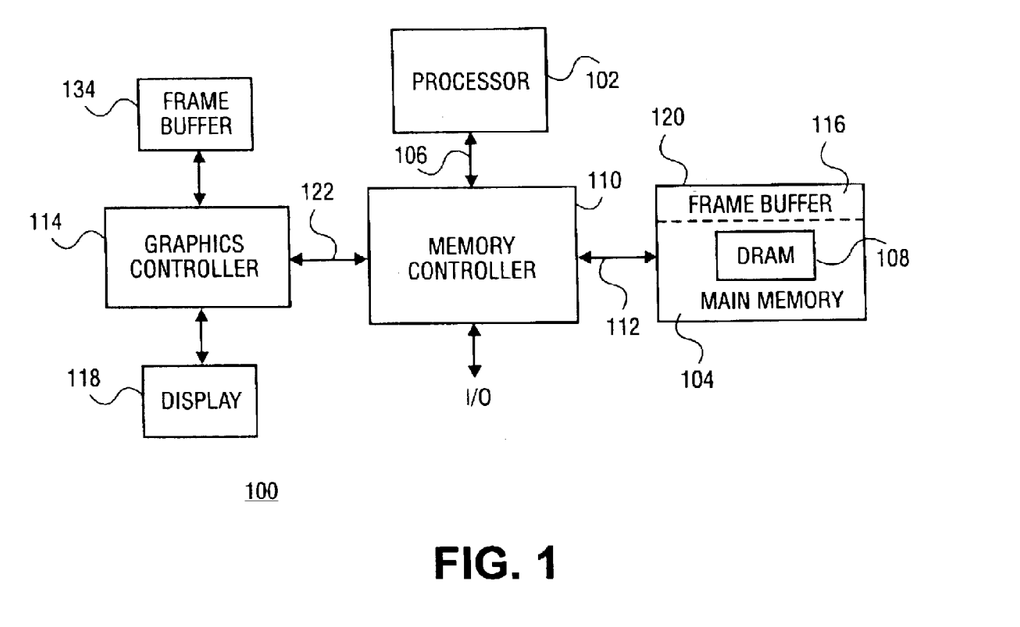
FIG. 1 illustrates a block diagram of an embodiment of an exemplary computer system embodying the present invention.

FIG. 1 illustrates a functional block diagram of an embodiment 100 of an exemplary computer system embodying the present invention. Computer system includes processor 102 and main memory 104 including rows of DRAMs 108. In one embodiment, processor 102 is a processor in the Pentium.RTM. family of processors including the Pentium.RTM. IV family and other processors available from Intel Corporation of Santa Clara, Calif. Alternatively, other processors may be used. Additional devices may also be coupled to the processor bus, such as multiple processors and/or multiple main memory devices. Computer system is described in terms of a single processor; however, multiple processors can be coupled to the processor bus. In one embodiment, a digital signal processor (not shown in FIG. 1) is coupled to the processor bus.

Main memory 104 is a memory in which application programs are stored and from which processor 102 primarily executes. One skilled in the art will recognize that main memory can be comprised of other types of memory and the use of DRAM 108 used for illustrative purposes only. For example, main memory 104 can be comprised of SDRAM (Synchronous DRAM) or RDRAM (RAMBUS DRAM) or DDR (Double Data Rate synchronous DRAM).

Processor 102 is coupled to memory controller 110 by bus 106. Memory controller 110 is in turn coupled to main memory 104 by memory bus 112. In one embodiment, memory controller 110 may be coupled to or include an integrated graphics controller 114. Graphics controller 114 accesses local frame buffer 116 to store and retrieve graphics data stored therein for display on display 118. Display 118 can be a CRT, liquid crystal display, or other display device. For systems that use a unified memory architecture configuration, local frame buffer 116 is replaced by partitioning a portion of main memory 104 to create frame buffer 116, resulting in shared memory 120.

As used herein, a "memory request" is a transfer of command and address between an initiator and main memory 104. A "read memory request" is a transfer of data from main memory 104 to the initiator. For example, processor 102 may initiate a read memory request to transfer data from main memory 104 to processor 102. A "write memory request" is a transfer of data from the initiator to main memory 104. For example, processor 102 may initiate a write memory request to transfer data from processor 102 to main memory 104. Control information (including, e.g. the priority level and the read/write nature of the memory request) may be conveyed concurrent with the memory request or using a predefined protocol with respect to conveyance of the address.

As used herein, a "page" refers to a block of data stored within a same row of DRAMs 108 that comprise main memory 104. The row is accessed via a row address provided by memory controller 110, and then the column address of the particular datum being addressed is provided (typically using the same address lines used to provide the row address). Another column address can be used to access additional data within the row without providing the row address again (referred to as a "page hit"). Reading or writing additional data from the same row in this manner (referred to as "page mode") may allow for lower latency access to the data, since the row address need not be provided in between each column access. This also results in better utilization (and thus available bandwidth) of memory.

If the memory read request hits an already "open" page, the memory read request is sent to the memory controller where it is serviced. In a typical implementation, memory controller records the page (e.g. the row portion of the address) of the current memory request in priority/state machine unit. If, within the DRAM idle time period, another memory request is detected and is to the same page as the current memory request (detected by comparing the page recorded in priority/state machine unit), then the current data transfer may be continued without any pages being closed.

Controller conveys the address of the selected memory request to main memory along with corresponding control information via bus. In a typical implementation, the control information includes a write enable line to indicate that the request is a read or write, a row address strobe line to indicate that the row portion of the address is being conveyed, and a column address strobe line to indicate that the column address is being conveyed. If the request is a read, the selected data is provided by main memory.

If the incoming agent accesses a different page, then the current page would be closed and the new page accessed by providing the row address of the new agent memory request, then the corresponding column addresses.

Figure 2:
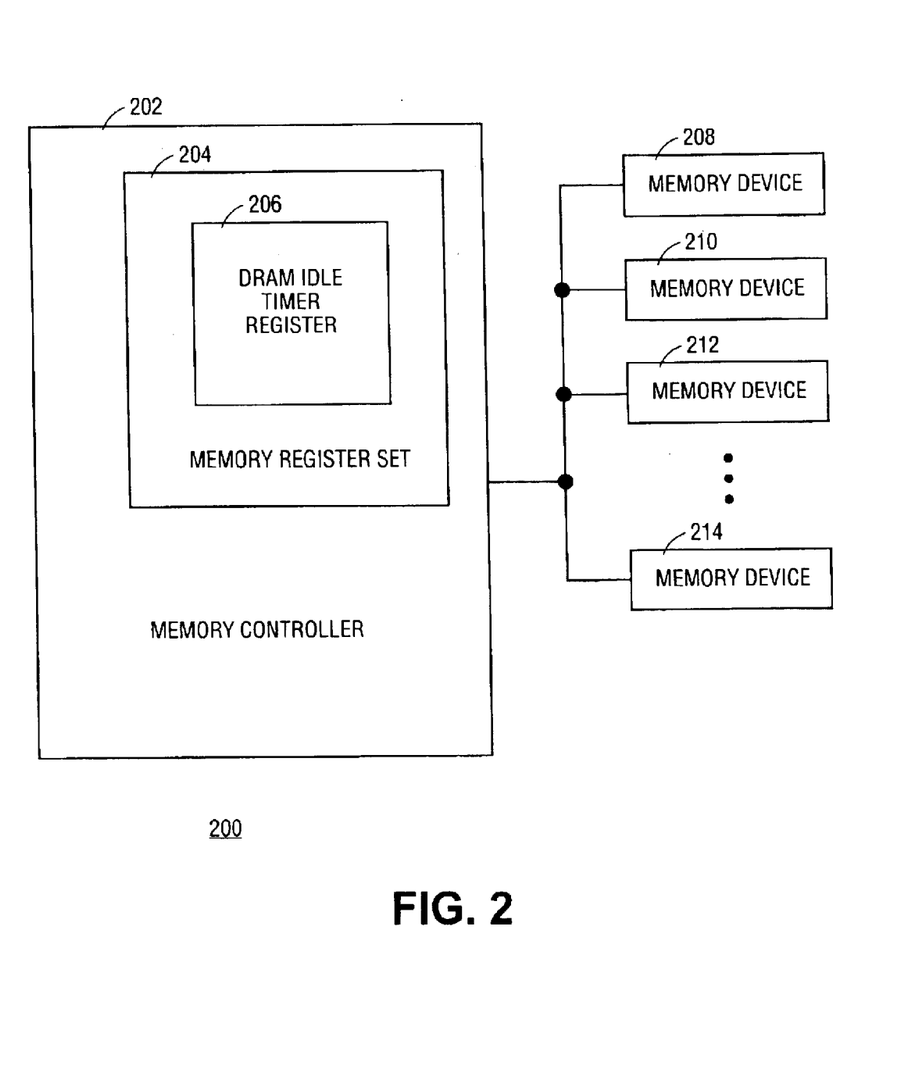
FIG. 2 illustrates a block diagram of an embodiment of a configuration for memory access.

FIG. 2 is a block diagram of an embodiment 200 of devices for accessing DRAM. In one embodiment, memory controller 202 includes memory register set 204. Memory register set 204 includes thirty-two (32) registers configured to maintain 32 banks of memory open simultaneously; however, any number of registers and any number of open banks of memory can be supported for use with the present invention.

In one embodiment memory register set 204 includes DRAM idle timer register 206 that determines a DRAM pre-charge policy. DRAM idle timer register 206 includes a pre-charge control field that determines the action taken when a page miss occurs. The format and functionality of DRAM idle timer register 206 is described in greater detail below. Memory controller 202 is coupled to multiple rows of memory devices (e.g., 208, 210, 212 and 214).

Memory controller 202 and registers of memory register set 204 operate together to support multiple open banks of memory. When a page miss occurs, a bank of memory is closed in order to open a new bank of memory that includes the target address of the operation that caused the page miss. Adaptive DRAM idle timer selectively pre-charges (close) a bank of memory that is less likely to be used in the future.

Figure 3:
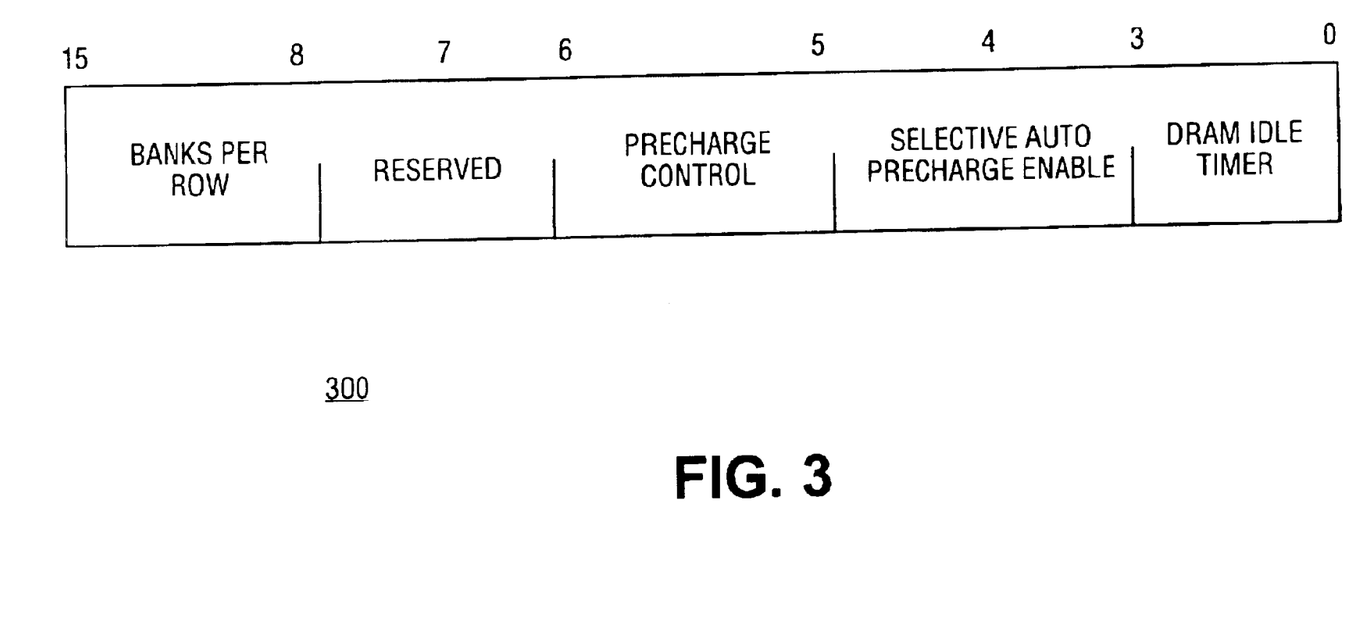
FIG. 3 illustrates a block diagram of an embodiment of an idle timer register for a memory.

FIG. 3 is one embodiment 300 of a DRAM idle timer register 302. In one embodiment, DRAM idle timer register 302 is a 16-bit register; however, the size can be modified based on the number of banks supported as well as other features of the DRAM sub-system used therewith.

Bits 0–3 are DRAM Idle Timer (DIT) bits 304 that are used to determine the number of clock cycles during which the DRAM controller remains in the idle state before pre-charging all banks of a memory row with Precharge All command. The Precharge All command causes all banks of a selected memory row to be precharged. In one embodiment, the banks of the selected memory row are in an idle state after the Precharge All command has been completed.

Page-miss cycles have a minimum penalty of $(t_{RP}+t_{RCD})$ over the page-hit cycles. $t_{RP}$ is the row pre-charge time. $t_{RCD}$ is the row to column access delay time. For example, a page miss occurs if the incoming memory request requires closing a page being used and a page hit occurs when the memory read request hits an already open page. Page-empty cycles have a penalty of $t_{RCD}$ over page-hit cycles. In particular, an "empty" page occurs when no currently open page has to be closed to open the incoming memory page. In other words, a page can be opened without interrupting the other stream.

In a typical implementation, when a page is open and a page miss cycle occurs, a pre-charge, activate and read and write are executed, incurring a $t_{RP}$ and $t_{RCD}$ penalty. If the page is closed and a page empty cycle occurs, only an activate, read and write are implemented, incurring only a $t_{RCD}$ penalty. For optimum functioning, the number of page-misses $(N_{PM})$ is minimized while the number of page-hits $(N_{PH})$ is maximized. As a result of an increased number of page hits and decreased number of page misses, the penalties are minimized and performance optimized.

To optimize latency, the function $W_{PH}*N_{PH}-W_{PM}*N_{PM}$ is maximized. $W_{PH}$ and $W_{PM}$ are weights associated with the page hit and page miss cycles respectively. The weight associated with a page miss ($W_{PM}$) will be greater than the weight associated with a page hit ($W_{PH}$) to emulate the reduction in page-misses having more effect on optimization than the increase in page-hit cycles. For example, in a typical implementation, page-miss cycles decrement an optimal counter (which is used to determine a dynamically optimized setting for the DRAM idle timer) by a 4-bit weight value, for example 0111b, and page-hit cycles increment the same optimal counter by a different (smaller than the page-miss increment) 4-bit weight value, for example 0100b. Thus, the counter is weighted by different weights. If there is a page miss, it is counted as a bigger mistake than a page hit. If there is a page miss, the optimal counter is incremented by 3 or 4. If there is a page hit, the optimal counter is incremented by 1. By using a weighted function, a page miss is assigned a bigger penalty than a page hit. The weight values are programmable through configuration registers by the BIOS, thus emulating a very near to real-life function of optimum behavior. The BIOS programmability of weights, $W_{PH}$ and $W_{PM}$, allows for modeling $t_{RD-PRE}$ and $t_{WR-PRE}$.

Embodiments of the present invention provide for adaptively tuning the DRAM idle timer value in real time. Selected DRAM idle clock cycles are sampled to dynamically determine an optimized DRAM idle timer value. In particular, the DRAM idle timer can be programmed to be idle for a specific number of clocks before the pre-charge all command is issued. In a typical implementation, these clocks can include zero, middle and infinite clocks. The clock cycles settings are programmable and thus adaptable depending on the particular configuration.

One skilled in the art will recognize that the present configuration is not limited to the zero, middle and infinite idle clock settings described herein. Rather, the following table describes other embodiments of DIT bits 304 that can be selectively sampled.

Figure 4:
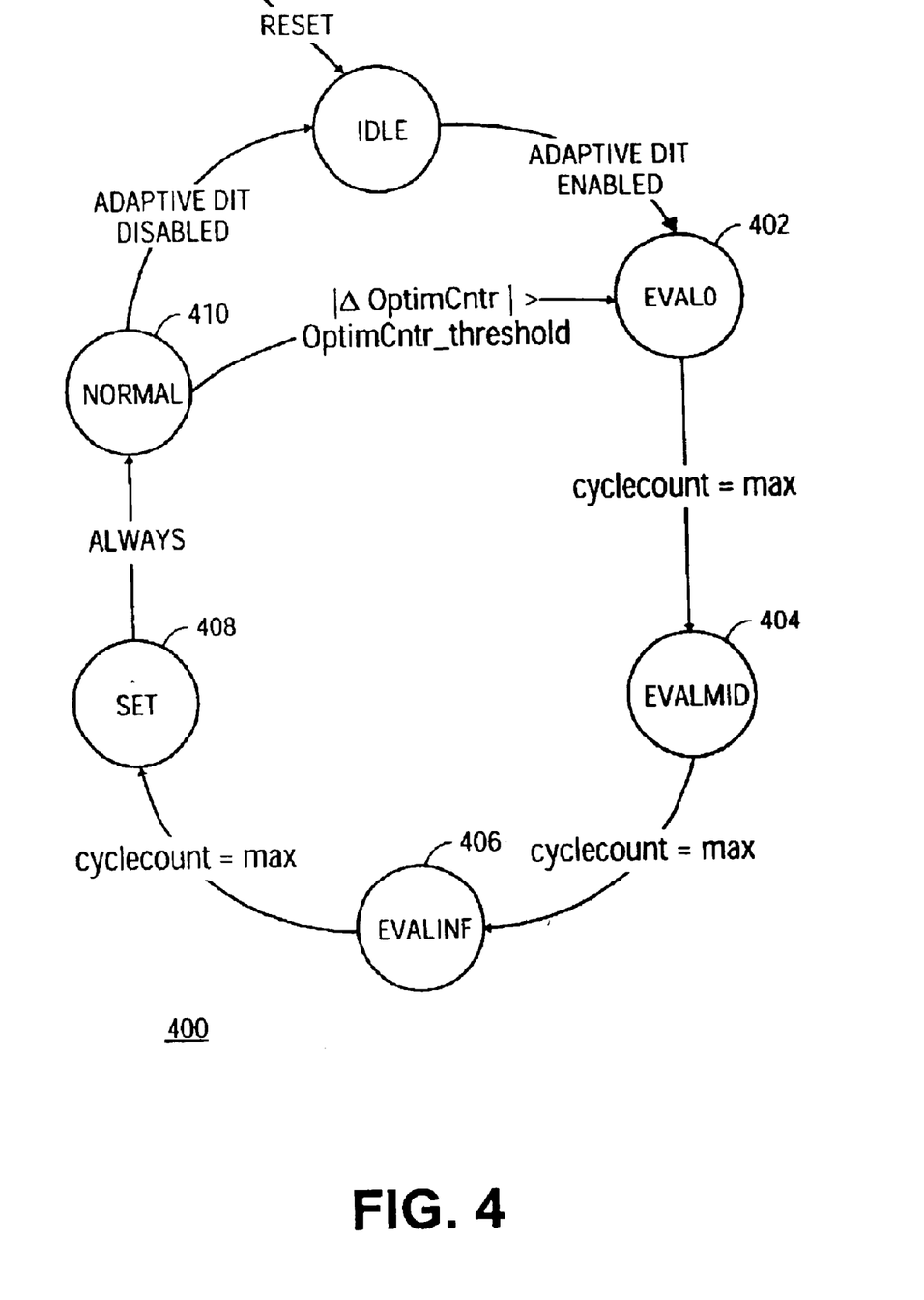
FIG. 4 illustrates a diagram of an embodiment of a state machine to affect an adaptive memory idle timer scheme.
Figure 5:
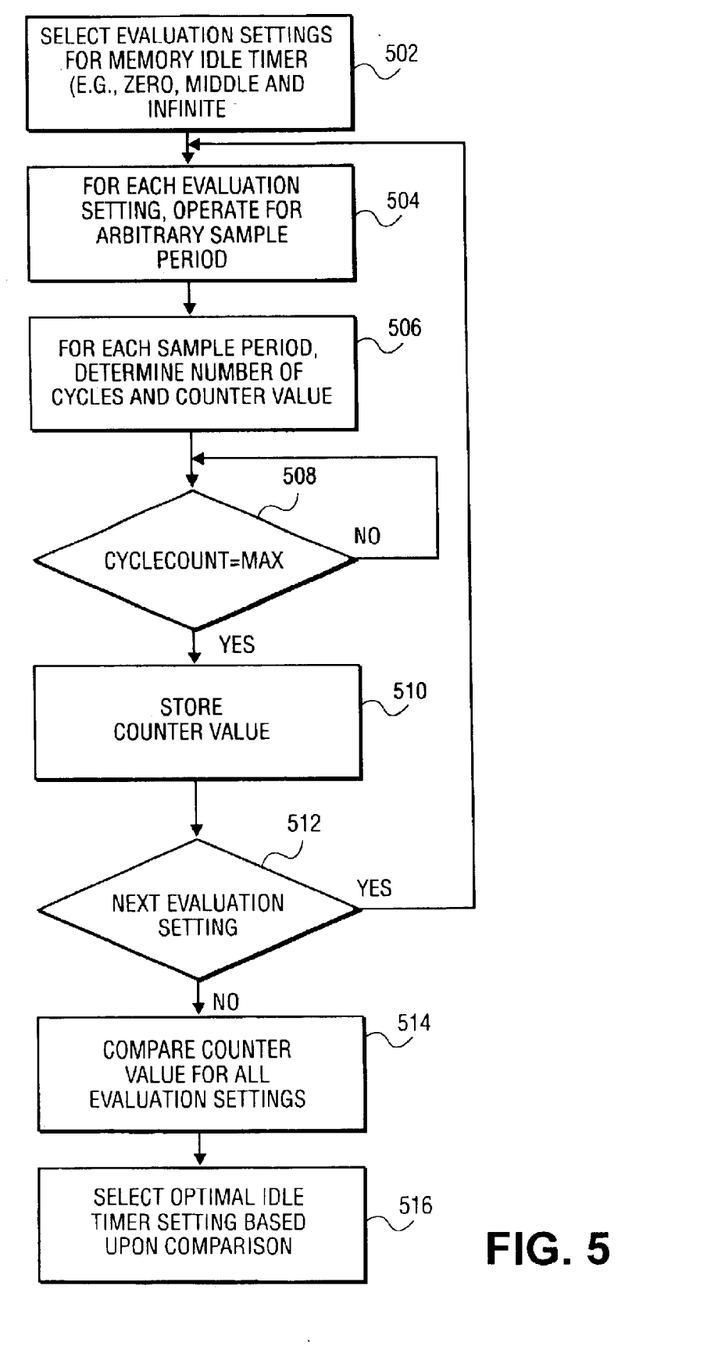
FIG. 5 illustrates a flow diagram of an embodiment of a routine for adaptively determining a memory idle timer value.
Figure 6:
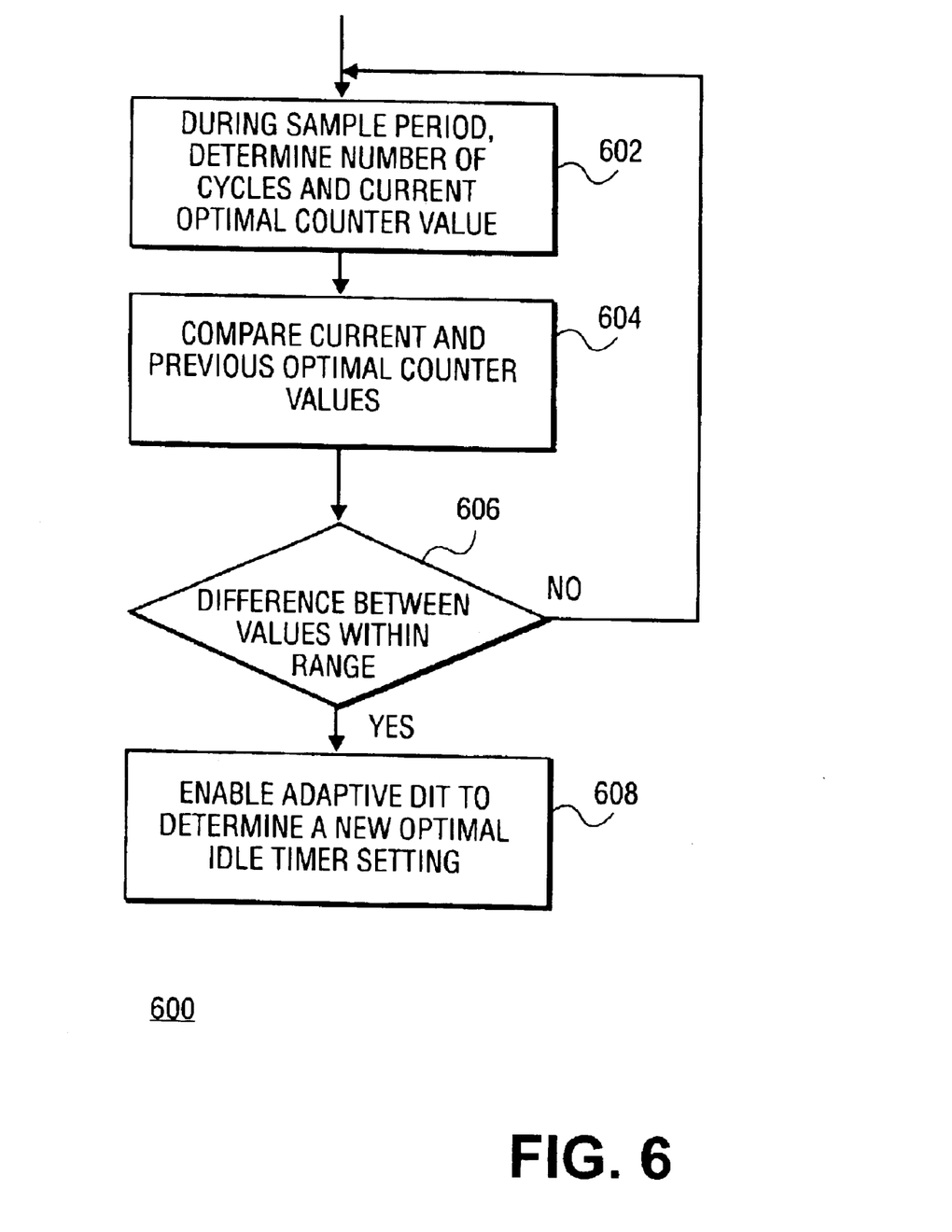
FIG. 6 illustrates a flow diagram of an embodiment of a routine for continuously optimizing the adaptive memory idle timer value.

Idle clocks before
Precharge All
DIT Command
0
2
4
8
10
12
16
32
1XXX Pages are not closed for idle condition FIG. 4 illustrates a diagram of an embodiment 400 of a state machine to affect an adaptive memory idle timer scheme. The adaptive DRAM idle timer sequence includes two subroutines: scan-sample (FIG. 5) and normal operation (FIG. 6). FIG. 5 illustrates a flow diagram of an embodiment 500 of a routine for adaptively determining a memory idle timer value. One skilled in the art will recognize that timer may be replaced with a counter or other device that counts a predetermined number of clock cycles after a memory agent has completed a memory transaction.

In step 502, evaluation settings are selected for the memory idle timer. In particular, selected DRAM idle clock cycles are sampled to dynamically determine an optimized DRAM idle timer value. The DRAM idle timer can be programmed to be idle for a specific number of clocks before the pre-charge all command is issued. For example, referring to FIG. 4, in a typical implementation, the DRAM idle timer is set to each of three settings: zero, middle and infinite clocks. These settings are represented as EVAL0 402, EVALMID 404 and EVALINF 406. The clock cycle settings are programmable and thus adaptable depending on the particular configuration.

Referring to FIG. 5, in step 504, for each of the three settings, the memory controller operates for a "sample" period. The sample period is a predefined time that the memory controller operates with a specific setting (for example, DIT=infinite).

In a typical implementation, DRAM idle timer is activated for a predetermined number of clock cycles after memory agents have completed its access to main memory.

For example, in the zero clock setting, DRAM idle timer expires (or times out) zero (0) clock cycle after a memory agent has completed its access of main memory. In other words, for a zero DRAM idle timer setting, the pages are closed after each access.

In the middle clock setting, timer expires (or times out) eight (8) clock cycles after a memory agent has completed its access of main memory. In a typical implementation, after a memory request is done, the system waits 8 clock cycles to see if there is a request for the same page. If not, the page is closed. One skilled in the art will recognize that the present invention is not limited to a specific middle clock setting. For example, in another embodiment, in the middle clock setting, timer expires (or times out) sixteen (16) clock cycles after a memory request has completed its access of main memory. If there is no memory request for the same page after the DRAM idle clock expires, the page is closed.

In the infinite clock setting, DRAM idle timer expires (or times out) infinite clock cycles after the memory agent has completed its access of main memory. In other words, for an infinite DRAM idle timer setting, the pages are not closed.

In step 506, for each sample period, the number of cycles and optimal counter value are determined.

In step 508, the sample period is aborted when the number of cycles reaches a predefined maximum value. In particular, in a given time period, whenever there is a page hit, the counter is incremented and when there is a page miss, the counter is decremented. To optimize latency during sampling, the number of page hits ($N_{PH}$) and number of page misses ($N_{PM}$) are multiplied by weighted values $W_{PH}$ and $W_{PM}$, respectively, such that the weighted function ($W_{PH}*N_{PH}$)−($W_{PM}*N_{PM}$) is maximized. The weight associated with a page miss ($W_{PM}$) is greater than the weight associated with a page hit ($W_{PH}$), resulting in a bigger penalty for a page miss than a page hit. The weight values are programmable through configuration registers by the BIOS.

In step 510, in the end of each sample-period, the counter value (for the given setting i.e. zero, middle or infinite) is stored.

Steps 504–510 are repeated for each sample period (step 512).

In step 514, in the end of the three sample periods, the optimal counter value of all three settings is compared.

In step 516, the scan-sample step concludes when the DIT value is selected out of the evaluation settings, based on the optimal counter value comparison. As shown in FIG. 4, this optimal DIT value is set 410 and used in normal mode operation 408 as described below.

FIG. 6 illustrates a flow diagram of an embodiment 600 of a routine for continuously optimizing the adaptive memory idle timer value. During the normal mode, the memory controller operates with the selected memory idle timer value determined in the scan sample subroutine shown in FIG. 5 and discussed above. One skilled in the art will recognize that the memory controller can also be adapted to operate with a memory idle timer setting by other methods.

During the normal mode, sample-period actions are continuously performed, in order to detect when the selected memory idle timer value is no longer most optimized and thus a new scan-sample step should be entered.

In step 602, the DRAM idle timer enters a sample-period and the number of cycles and current optimal counter value are determined.

In step 604, the current measured optimal counter value is compared with the previous optimal counter value. The previous optimal counter value is determined in the scan sample routine shown in FIG. 5 and described in detail above. In another embodiment, the previous optimal counter value may be determined by another method.

In step 606, in response to the optimal counter value falling outside of the optimal counter threshold value range, the routine returns back to the scan sample subroutine to determine a more optimal memory dle timer setting. For example, if OptimCntr value−Previous OptimCntr value>OptimCntrThreshold value or Previous OptimCntr value−OptimCntr value>OptimCntrThreshold value the scan sample subroutine is initiated to determine a more optimal memory idle timer control value (step 608). In a typical implementation, the scan sample evaluation mode are cycled through to determine a new memory idle timer value.

In step 606, in response to the optimal counter value falling within the optimal counter threshold value range, sample-period actions continue to be performed to detect when the selected memory idle timer value is no longer most optimized and thus a new scan-sample subroutine initiated. The optimal counter value determined in the last scan-sample remains optimal as long as it falls within a range established by the optimal counter threshold value. The optimal counter threshold value may be programmable and adjusted for particular configurations.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method to adaptively determine an optimal memory idle timer setting, comprising:
   receiving a plurality of memory accesses;
   setting a timer device to a plurality of selected idle timer states and processing the memory accesses for a predefined period of time;
   evaluating each selected idle timer state by calculating a weighted result based upon the page hits and misses including selectively weighting the page hits and page misses differently; and
   selecting the optimal idle clock setting for the timer device from the selected idle timer states based upon the weighted results.

2. The method claimed in claim 1, wherein evaluating each selected idle timer state by calculating a weighted result based upon the page hits and misses further comprises:
   incrementing the timer device in response to an idle command;
   determining whether the timer device selected idle timer state has been reached;
   in response to the idle timer state being reached, closing the pages; and
   determining the number of page hits and page misses within the predefined period of time.

3. The method claimed in claim 1, wherein selectively weighting the page hits and page misses differently further comprises:
   assigning a greater weight value penalty to the page misses than the page hits.

4. The method claimed in claim 1, wherein selecting the optimal idle clock setting for the timer device from the selected idle timer states based upon the weighted results, further comprises:
   selecting the optimal idle clock setting from the selected timer state that has the maximized weighted result in accordance with $(W_{PH}*N_{PH})-(W_{PM}-N_{PM})$ where
   $W_{PH}$=weighted value for page hit
   $N_{PH}$=number of page hits
   $W_{PM}$=weighted value for page miss
   $N_{PM}$=number of page misses.

5. The method claimed in claim 1, wherein the weight values are programmable.

6. The method claimed in claim 1, wherein setting a timer device to a plurality of selected idle timer states, further comprises:
   setting the selected idle timer states to zero, middle and infinite clock settings.

7. The method claimed in claim 1, further comprising:
   continuously optimizing the selected idle timer setting.

8. The method claimed in claim 7, wherein continuously optimizing the selected idle timer setting, further comprises:
   selecting an optimal threshold range value;
   determining whether the difference between the current idle timer setting value and the selected idle timer setting value fall within a threshold range value.

9. The method claimed in claim 8, further comprising:
   in response to the difference falling outside the threshold value, returning to evaluating each selected idle timer state setting to determine an optimal idle timer setting.

10. A system comprising:
    an agent coupled to a bus and capable of generating memory access command on the bus;
    a memory; and
    a bus bridge circuit coupled to the bus and memory and including an idle timer, wherein the bus bridge circuit sets the idle counter to a plurality of evaluation idle timer states while processing memory accesses for a predefined period of time, wherein the bus bridge circuit evaluates each idle timer state setting by calculating a weighted result based upon the page hits and misses including selectively weighting the page hits and page misses differently and selects the optimal idle timer setting from the evaluation idle timer state settings based upon the weighted results.

11. The system claimed in claim 10, wherein the bus bridge circuit increments the idle timer in response to an idle command, determines whether the idle timer state setting has been reached, closes the pages in response to the idle timer state setting being reached and determines the number of page hits and page misses within the predefined period of time.

12. The system claimed in claim 10, wherein the bus bridge circuit assigns a greater weight value penalty to the page misses than the page hits.

13. An apparatus comprising:
    an idle timer circuit; and
    a page management circuit that sets the idle timer to a plurality of evaluation idle clock states while servicing memory requests for a predefined period, wherein the page management circuit evaluates each idle clock state setting by calculating a weighted result based upon the page hits and misses including selectively weighting the page hits and page misses differently and selecting the optimal idle clock setting from the evaluation idle clock state settings based upon the weighted results.

14. The apparatus claimed in claim 13, wherein the page management circuit increments the idle timer in response to an idle command, determines whether the idle timer state setting has been reached, closes the pages in response to the idle timer state setting being reached and determines the number of page hits and page misses within the predefined period of time.

15. The apparatus claimed in claim 13, wherein the page management circuit assigns a greater weight value penalty to the page misses than the page hits.

16. A machine readable medium having stored therein a plurality of machine readable instructions executable by processor to adaptively determine an optimal memory idle timer setting, comprising:

instructions to receive a plurality of memory accesses;

instructions to set a timer device to a plurality of selected idle timer states and process the memory accesses for a predefined period of time;

instructions to evaluate each selected idle timer state including instructions to calculate a weighted result based upon the page hits and misses including instructions to selectively weight the page hits and page misses differently; and     instructions to select the optimal idle clock setting for the timer device from the selected idle timer states based upon the weighted results.

17. The machine readable medium claimed in claim 16, wherein instructions to calculate a weighted result based upon the page hits and misses further comprises:

instructions to increment the timer device in response to an idle command;

instructions to determine whether the timer device selected idle timer state has been reached;

in response to the idle timer state being reached, instructions to close the pages; and     instructions to determine the number of page hits and page misses within the predefined period of time.

18. The machine readable medium claimed in claim 16, wherein instructions to selectively weight the page hits and page misses differently further comprises:

instructions to assign a greater weight value penalty to the page misses than the page hits.

\* \* \* \* \*